Dec. 21, 1965 V. A. RYDBECK 3,225,224
DISTRIBUTION TRANSFORMER LIGHTING ASSEMBLY
Filed Oct. 22, 1962 3 Sheets-Sheet 3

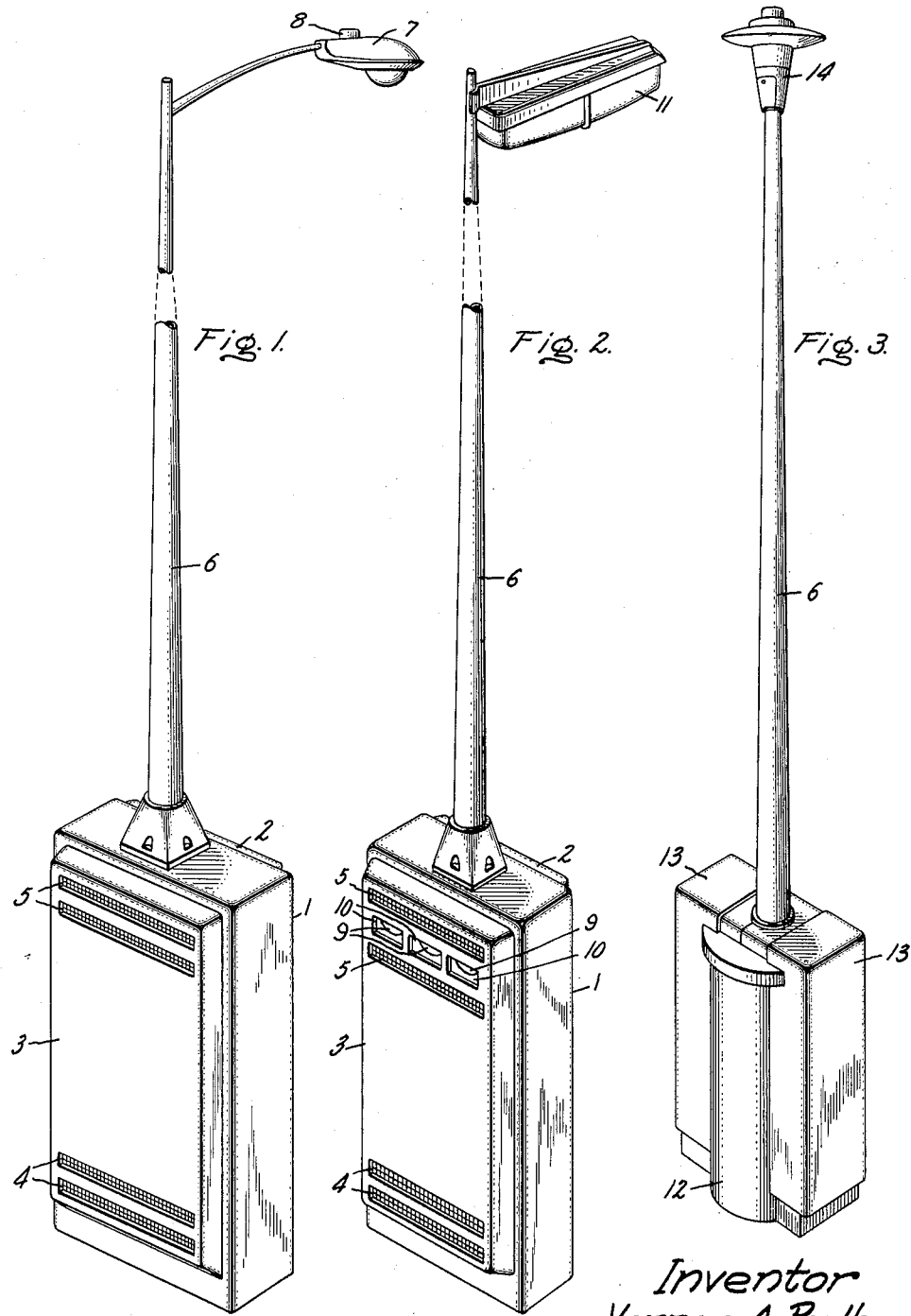

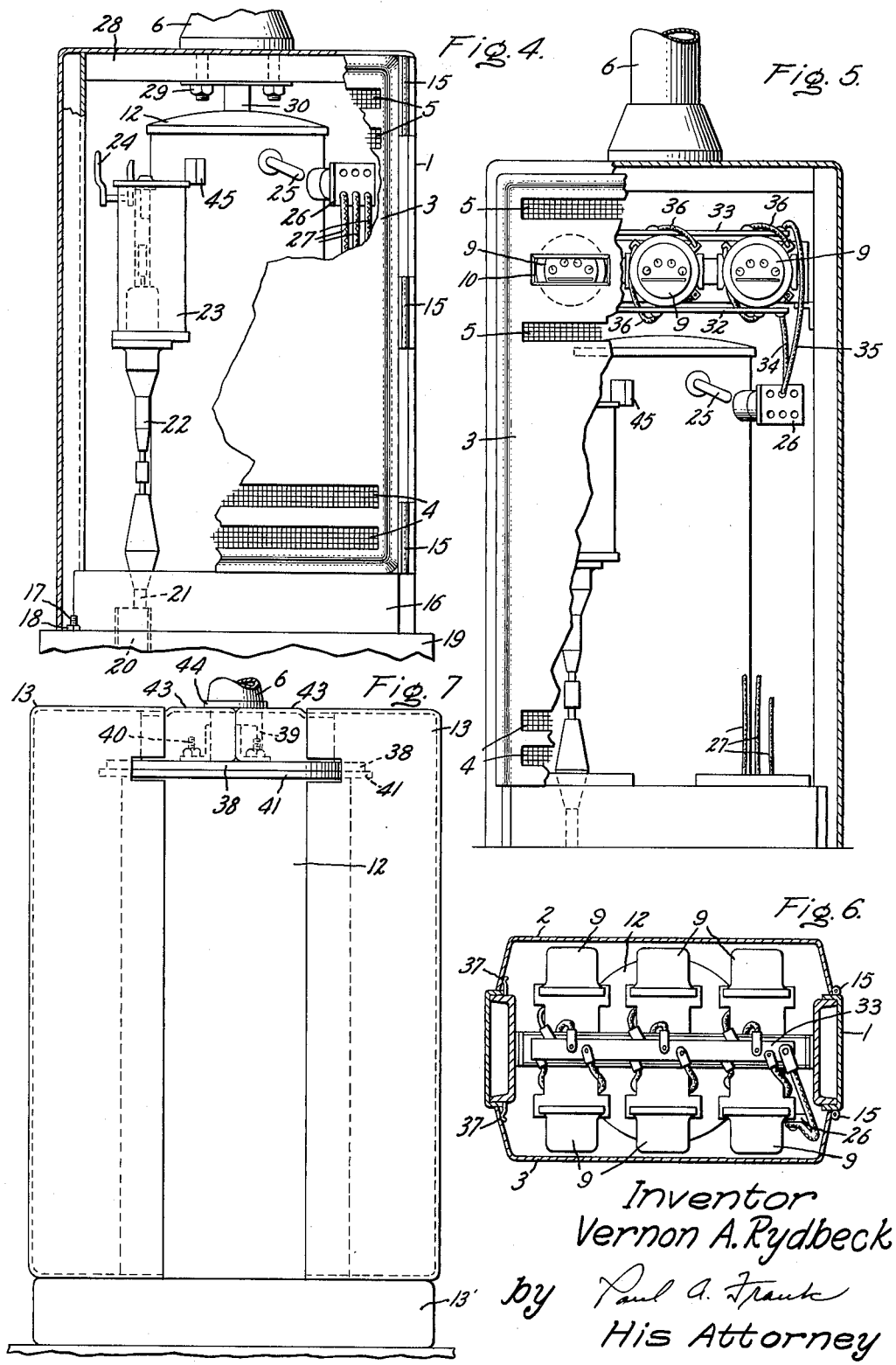

Inventor
Vernon A. Rydbeck,
by Paul A. Frank
His Attorney

United States Patent Office 3,225,224
Patented Dec. 21, 1965

3,225,224
DISTRIBUTION TRANSFORMER LIGHTING
ASSEMBLY
Vernon A. Rydbeck, Schenectady, N.Y., assignor to General Electric Company, a corporation of New York
Filed Oct. 22, 1962, Ser. No. 231,943
10 Claims. (Cl. 307—157)

My invention relates to electrical distribution systems and, in particular, to components used for distributing electrical energy in residential areas to provide both street lighting and electrical power to adjacent residences.

In the early days of distribution of electrical energy, it was customary to use poles adjacent a street curb to carry wires and to support distribution transformers. Because such poles were unattractive and met with objections by property owners, electric utility companies shifted to placing such poles at the rear of residential lots and thus relegated the distribution components to a position which was not quite as offensive to the property owners. More recently, since even such a system has been objected to by property owners, utility companies have attempted to eliminate the use of poles for supporting distribution transformers and wires carrying electrical energy and instead have tended to use underground distribution systems, the cables carrying the energy being placed underground and the distribution transformers, which require servicing and replacing, being located in enclosures above ground. Most utility companies using such underground residential distribution systems have located the distribution transformers at the rear of the residential lots. Such a distribution system introduced the problem of long underground runs to provide electrical energy for street lighting. An additional problem was the necessity of obtaining easements for the location of transformers and placement of underground cables. Still another problem was obtaining entry to the private property so that the component located at the rear of such lots could be serviced.

While a distribution system which uses underground cables and transformers located at the rear of lots presented many problems, the conventional and available distribution transformer system was bulky and unsightly so that utilities have not located such facilities at the front of the lot because of objections of property owners. Development of new residential areas with a desire for attractive surroundings has indicated a need for an arrangement by which proper street lighting could be provided while still obviating the problems of a distribution system using rear lot location of facilities.

It is an object of my invention to provide a new and improved component for a residential distribution system with compactly arranged street lighting equipment and electrical distribution systems especially adapted for location at a street curb.

Still another object of my invention is to effect improvements in electrical distribution systems which facilitate the distribution of electrical power in residential areas and the measuring of power supplied to individual residences.

A further object of my invention is to provide a new and improved unitary street lighting and distribution transformer arrangement.

In accordance with my invention, a system for distributing electrical energy to a residential area avoids the use of unsightly poles and the necessity for securing rights of way by employing a compact distribution transformer assembly adapted to be located at a street curb. The assembly functions both as a support for an attractive street light and as a point for distributing, by underground cables, electrical energy to adjacent residences. According to one feature of my invention, the assembly may include meters for measuring power supplied to residences, obviating the need for such meters in or on the homes and facilitating the task of reading such meters.

The novel features which are believed to be characteristic of the invention are set forth in the appended claims. The invention itself, however, together with further objects and advantages thereof may best be understood by reference to the following description taken in conjunction with the accompanying drawings, in which:

FIGURE 1 illustrates a distribution transformer-street lighting assembly of my invention;

FIGURE 2 illustrates a modification of my invention in which provision is made for measuring energy supplied to adjacent residences;

FIGURE 3 is a view illustrating another modification of my invention in which a distribution transformer provides direct support for the street lighting equipment;

FIGURE 4 is a front view partly in section of the distribution transformer arrangement of FIGURE 1;

FIGURE 5 is a front view partly in section of the component illustrated in FIGURE 2;

FIGURE 6 is a plan view of the metering arrangement of the component illustrated in FIGURE 5;

FIGURE 7 is a front view partly in section of the component illustrated in FIGURE 3;

Figure 8:
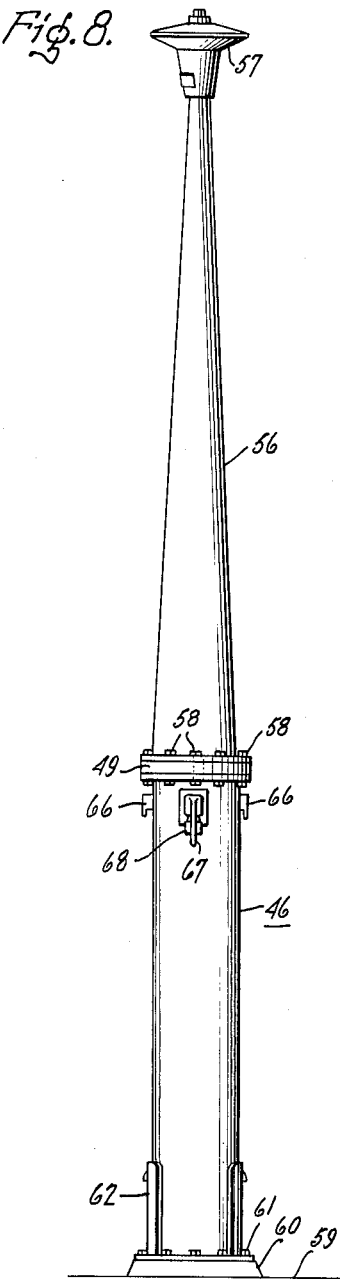
FIGURE 8 illustrates a modification of the distribution transformer-street lighting assembly of my invention.

In FIGURE 1, I have illustrated a combination distribution transformer-street lighting arrangement which comprises a generally rectangular metallic enclosure 1 having removable doors 2 and 3, each provided with a plurality of ventilating louvers 4, 5 located adjacent the bottom and top of the doors 2 and 3. Bolted to and extending vertically from the top of enclosure 1 is a pole 6 which, adjacent its upper extremity, supports a luminaire or street lighting fixture 7. The lighting fixture illustrated in FIGURE 1 is a conventional mercury vapor type and supports, on its upper surface, a photoelectric control 8 for controlling energization of the light to maintain ambient light above a minimum level.

The distribution transformer-street lighting component illustrated in FIGURE 2 is similar to that of FIGURE 1 and like components are identified by similar reference numerals. The assembly of FIGURE 2 includes, within enclosure 1, a plurality of watt-hour meters 9 visible through windows 10. If desired, the windows 10 may be protected from breakage and vandalism by means of suitably secured covers, not shown. The assembly of FIGURE 2 illustrates the use of a different type of lighting arrangement; namely, a fluorescent lighting fixture 11, supported from the top of pole 6. The arrangements of FIGURES 1 and 2 are to be used when relatively tall poles are employed to support the luminaire or street light at a distance of the order of 25-30 feet above the ground. In such an arrangement, the poles 6 may be made of either aluminum or steel, as desired. The enclosure 1, preferably, is a weather-resistant enclosure, for example, steel, able to withstand not only weather conditions, but typical mischievous attacks of children or mishaps due to traffic conditions. The enclosure 1 is relatively small in size as compared with conventional distribution transformer assemblies and may be no larger than the customary conventional mail deposit box. Preferably, it is attractively designed so that it has a pleasing appearance and is unobjectionable to adjacent property owners.

In the street lighting-distribution transformer assembly of FIGURE 3, the light bearing pole 6 is supported directly from the top of a transformer tank 12 in a manner to be described in detail later. In this arrangement, the enclosure comprises a portion of tank 12 and two metallic cover members 13 located on the sides of tank 12 and arranged to enclose the cables and accessories of the distribution transformer. The arrangement of FIGURE 3 is illustrated as including a mercury vapor or filament type light 14 at its upper extremity. It is, preferably, to be used where the light is to be located a shorter distance above ground in the order of ten feet.

FIGURE 4 illustrates details of the assembly of FIGURE 1 and shows the manner in which a distribution transformer, comprising primary and secondary windings, not shown, is located within a tank 12 located within enclosure 1. The doors 2, 3 of enclosure 1 are supported at the right hand edge by a plurality of hinges 15 and may be secured at the opposite edge by a conventional lock, not illustrated. The ventilating louvers 4, 5, preferably, are covered by screens to prevent entrance of undesired rodents and other objects. The enclosure 1, which includes a kick plate 16, is bolted by means of a plurality of studs 17 and nuts 18 to a foundation 19 extending into and supported on the ground. The foundation 19 is frequently identified in the electric utility industry as a transformer pad. Foundation 19 includes a plurality of vertically extending conduits 20, through which underground cables 21 supply high voltage electrical energy to the primary windings of the distribution transformer. Cables 21 are connected through conventional potheads 22 and a high voltage terminal chamber 23 to a disconnect switch, not shown, located within tank 12 and operated by a handle 24. The secondary windings of the distribution transformer are connected through a load break switch, not shown, also located in tank 12 and operated by handle 25 to a pair of external terminals 26 and the usual low voltage neutral terminal, not shown. Terminals 26 are arranged to have connected thereto a plurality of leads 27 which supply electrical energy through underground cables, not shown, to residences or other loads located adjacent the distribution point.

Pole 6, which supports the street lighting luminaire, is bolted to a horizontal upper member 28 of enclosure 1 by means of a plurality of bolt and nut arrangements 29. A conduit 30, extending from the distribution transformer, contains leads for supplying, through pole 6, electrical energy for a light supported at the upper extremity of the pole.

I also provide means for obviating the need for locating watt-hour meters in or on the adjacent homes supplied from the distribution point. In the arrangement shown in FIGURE 5, a plurality of such watt-hour meters 10 are connected by conventional circuit arrangement with cables 27 supplying energy to such residences or loads. Meters 10 are positioned between a pair of buses 32, 33 connected to output terminals 26 of the distribution transformer by means of cables 34, 35. The meters, in turn, are connected to the buses in a conventional wiring arrangement by means of a plurality of leads 36. Each of meters 10 is connected in circuit with one of the leads 27 connected through underground cables to a residence or other load being supplied with electrical energy.

The physical arrangement of watt-hour meters 10 with respect to transformer tank 12 and upper bus 33 is illustrated in the view shown in FIGURE 6. Six watt-hour meters are supported above the distribution transformer and may be connected to six external circuits to be supplied with energy from the transformer. This view also shows the manner in which doors 2, 3 are arranged to form the enclosure for the distribution transformer, the doors being hinged at the right hand edge by means of hinges 15 and secured at the left hand edge by means of locks 37.

In the arrangement of FIGURE 7, which illustrates some of the details of the assembly shown in FIGURE 3, transformer tank 12 is provided with a top cover 38. Pole 6 is provided at its lower end with a flange 39, which is bolted to cover 38 by bolts 40. To provide rigidity to the structure and to maximize the support for pole 6, cover 38 may be welded to upper flange 41 of tank 12. Since it is contemplated that this particular structure will be used for shorter poles, of the order of ten feet in height, this arrangement provides a smaller and more compact over-all assembly. In this arrangement, tank 12 forms a portion of the external enclosure and is bolted to foundation 19 by bolts, not shown. The remainder of the enclosure is constituted by a pair of side covers 13, arranged to abut tank 12, and kick plates 13' arranged to conceal the foundation bolts. A pair of removable light pole base covers 43 are positioned between the light pole 6 and side covers 13 to form a smooth, water-tight container for the assembly. A gasket 44, of rubber or other suitable material, placed around light pole 6 forms a water-tight seal between that pole and covers 43.

In the structure of FIGURES 3 and 7, the distribution transformer itself serves as the mounting for the street lighting pole. This arrangement includes disconnect switches and entrance cables, as illustrated in FIGURE 4, and the output terminal arrangement illustrated in FIGURES 4 and 5. Covers 13, hinged to tank 12, serve to protect both such switches, cables, and terminals. Preferably, these covers are arranged so that they can be swung open for inspection of such connections. In each of the structures shown in FIGURES 4, 5, and 7, transformer tank 12 is provided with a plurality of lifting lugs 45 to facilitate removal of the transformer with its tank from the enclosure and the foundation 19.

While in the assemblies illustrated in FIGURES 1 and 2, enclosures 1 completely surround distribution transformer tanks 12 and in FIGURE 3 covers 13 partly surround tank 12, in some cases the transformer tank itself may form the sole enclosure for the transformer windings. This is illustrated in the modification of my invention shown in FIGURES 8 and 9, in which a transformer 46 is of the coaxial core type comprising a center magnetic core portion 47 and an outer magnetic yoke portion 48 together with magnetic end pieces 49, 50. Positioned between rod-like center core portion 47 and outer yoke portion 48 are an insulated primary winding or coil 51 having leads 52 adapted to be connected to an external source of alternating current, not shown, and an insulated secondary winding or coil 53 having leads 54 adapted to be connected to a load, not shown. Leads 52, preferably, are underground cables connected to a source of high potential, while leads 54 supply electrical energy through underground cables to residences or other loads located adjacent the distribution point. Transformer 46, preferably, is of the coaxial core type described and claimed in United States Patent No. 2,962,679, issued November 29, 1960 to Jerry L. Stratton, and assigned to the assignee of this present invention. The transformer may be either a dry type or a liquid filled type containing a liquid 55, such as oil or Pyranol dielectric material, to provide better insulation for the windings and permit operation at high voltages.

In accordance with my invention, transformer 46 forms the lower portion of a unitary street lighting assembly having a tapered metal upper portion 56 which supports, at its upper extremity, a luminaire or street lighting fixture 57. The upper pole portion 56 may be bolted to top 49 of transformer 46 by a plurality of bolts 58 or, alternatively, may be welded to the top of the transformer to provide a more rapid construction. Transformer 46 itself is supported on a concrete foundation 59 and a mounting ring 60 by means of a plurality of bolts 61. The bottom portion of the transformer includes a pair of covers 62 over openings 63 provided in the wall of the transformer enclosure for permitting access to connecting lugs 64 and potheads 65. Transformer 46 is also provided with a plurality of lifting lugs 66 and a disconnect switch 67 secured in its open or closed position by means of a lock 68 to prevent unwanted operation or tampering. Electrical connection between secondary winding 48 and lighting fixture 57 is made by leads or cables 69.

Figure 9:
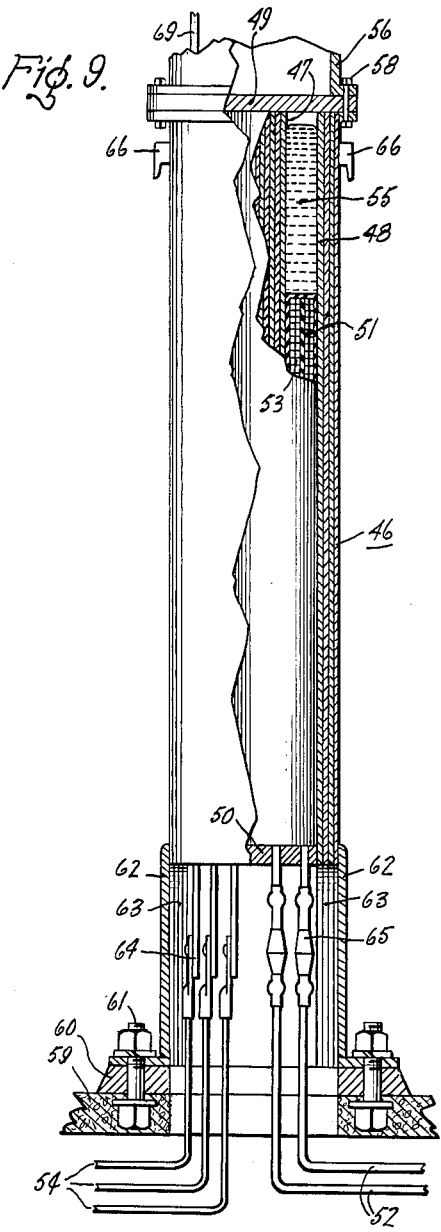
FIGURE 9 is a front view partly in section of a portion of the assembly of FIGURE 8.

In the modification shown in FIGURES 8 and 9, outer yoke portion 48 becomes both a portion of the lighting assembly pole and also means for cooling the transformer windings. In a typical construction, transformer 46 has an outer diameter of approximately 18 inches and a total vertical height of approximately six feet. This permits construction of a street lighting assembly having an overall height of from 12 to 14 feet which is relatively small in diameter and total size and attractive in appearance.

An important advantage of my improved distribution transformer-street lighting assembly is that it provides a compact structure which may easily be installed or replaced whenever necessary. In some of the forms illustrated, by providing ventilating louvers at the top and bottom of the enclosure for the transformer, a chimney effect is obtained to enhance cooling of the transformer. Obviously, external cooling fins may be added, if desired, to increase this cooling effect. Since all the transformer components are at ground level and the connections are easily accessible, my improved construction eliminates both the need of poles for supporting the transformer and the problem of raising the transformer to such poles. Obviously, also the hazard of climbing poles in all types of weather for servicing the transformer is, likewise, eliminated improving the safety aspects of electrical energy distribution.

A particular advantage of the structures illustrated and described are that they are relatively small in size and attractive; they permit both the installation of custom lighting fixtures and ornamentation of the pole for improving the appearance of a residential area.

Although the invention has been illustrated and described as applied to several particular types of distribution transformer-street lighting assemblies, it is obvious that modifications of the arrangements illustrated may be made. Accordingly, my invention is to be considered as limited only by the scope of the appended claims.

What I claim as new and desire to secure by Letters Patent of the United States is:

1. In an electric power distribution system, the combination comprising:
   a transformer comprising primary and secondary windings arranged to be supported on the ground;
   an enclosure for said transformer;
   a vertically extending pole attached to said enclosure and having a lighting fixture supported adjacent its upper extremity;
   electrical connections between said secondary winding and said lighting fixture;
   said transformer being arranged to have a high voltage potential supplied to said primary winding from an underground cable;
   means for supplying potential from said secondary winding through underground cables to an external load; and
   means within said enclosure for measuring the amount of electrical power supplied to such an external load.

2. In an electrical power distribution system, the combination comprising:
   a foundation supported on the ground;
   a transformer comprising primary and secondary windings supported on said foundation;
   means enclosing said transformer;
   a substantially vertically extending pole attached to said enclosing means;
   lighting means supported adjacent the upper extremity of said pole and being connected to said secondary winding;
   said transformer being arranged to have a high voltage potential supplied to said primary winding from an underground cable;
   means for supplying potential from said secondary winding through an underground cable to an external load;
   said enclosing means including means for cooling said transformer; and
   means within said enclosing means for measuring the amount of electrical power supplied to an external load.

3. In an electrical distribution system, the combination comprising:
   a foundation supported on the ground;
   an enclosure mounted on said foundation;
   a transformer comprising primary and secondary windings positioned within said enclosure;
   said primary winding having a disconnect switch connected thereto and said secondary winding having an output bus connected thereto;
   a substantially vertically extending pole supported from said enclosure and having lighting means attached adjacent its upper extremity;
   means whereby a high voltage may be supplied from an underground input cable through said switch to said primary winding;
   means for supplying output current from said bus through separate output underground cables to a plurality of external loads; and
   ventilating louvers located adjacent the bottom and top of said enclosures for promoting the circulation of cooling air over said transformer.

4. The combination of claim 3 in which a watt-hour meter is connected between said bus and each output cable.

5. In an electrical distribution system, the combination comprising:
   a transformer pad mounted on the ground;
   a substantially rectangular metallic enclosure supported on said pad;
   a transformer comprising primary and secondary windings supported within said enclosure;
   a switch connected to said primary winding;
   an output bus connected to said secondary winding;
   a vertically extending pole supported from the top of said enclosure;
   a light mounted at the top of said pole and connected to said secondary winding;
   an underground input cable connected to said switch for supplying high voltage current to said primary winding;
   a plurality of underground output cables connected to said bus for supplying low voltage output current to external loads;
   one side of said enclosure comprising a door to facilitate access to and servicing of said transformer.

6. The combination of claim 5 which includes ventilating louvers adjacent the top and bottom of said enclosure to promote the circulation of cooling air over said transformer.

7. The combination of claim 5 which includes a watt-hour meter connected between said bus and each of said output cables.

8. The combination of claim 7 which includes a window in said enclosure to facilitate the reading of said meters.

9. In an electric power distribution system, the combination comprising:
   a transformer comprising primary and secondary windings,
   a metallic enclosure for said windings arranged to be supported on the ground;
   a vertically extending pole attached to the upper end of said enclosure and having a lighting fixture supported adjacent its upper extremity;
   said transformer being arranged to have a high voltage potential supplied to said primary winding from an underground cable;

electrical connections between said secondary winding and said lighting fixture, and means for supplying potential from said secondary winding through underground cables to an external load, said transformer being of the coaxial core type and said enclosure forming a part of the transformer magnetic circuit.

10. The combination of claim 9 in which a door is provided near the bottom of said enclosure to facilitate connecting said windings to underground cables.

References Cited by the Examiner

UNITED STATES PATENTS 342,552  5/1886  Westinghouse _____ 307—17

LLOYD McCOLLUM, *Primary Examiner.*